United States Patent [19]
Visser

[11] 3,994,604
[45] Nov. 30, 1976

[54] PISTON AND ROD CONNECTION

[75] Inventor: Peter J. Visser, Niles, Mich.

[73] Assignee: Clark Equipment Company, Buchanan, Mich.

[22] Filed: June 30, 1975

[21] Appl. No.: 591,366

[52] U.S. Cl. ............................ 403/15; 403/84; 403/118; 403/318; 403/343; 403/16
[51] Int. Cl.[2] ................ B25G 3/00; E21B 9/16; F16D 1/00; F16D 3/84
[58] Field of Search ............ 403/4, 15, 16, 84, 100, 403/103, 118, 318, 320, 343, 356

[56] References Cited
UNITED STATES PATENTS

| | | | |
|---|---|---|---|
| 321,735 | 7/1885 | Lindsly | 403/320 X |
| 2,318,590 | 5/1943 | Boynton | 403/320 X |
| 3,293,993 | 12/1966 | Lanman | 403/343 X |
| 3,865,497 | 2/1975 | Bratt et al. | 403/15 |

FOREIGN PATENTS OR APPLICATIONS

| | | | |
|---|---|---|---|
| 623,646 | 1/1963 | Belgium | 403/356 |
| 4,231 | 1903 | United Kingdom | 403/343 |

*Primary Examiner*—Wayne L. Shedd
*Attorney, Agent, or Firm*—Kenneth C. Witt

[57] ABSTRACT

A screw type connection for rigidly mounting a piston on a rod and securing the connection. There is a pair of cooperating aligned slots in the outer piston and the inner rod. A locking member is located conjointly in the slots and a retainer member is provided to keep the locking member in position during operation.

1 Claim, 2 Drawing Figures

PISTON AND ROD CONNECTION

BACKGROUND OF THE INVENTION

1. Field of the Invention

This invention relates to a screw type connection for securely mounting a piston rigidly on a rod for use as one part of a piston and cylinder type linear hydraulic motor or actuator, for example.

2. Description of the Prior Art

Various types of connections have been used for mounting a piston on a rod for use as a part of a linear actuator, the other principal part being a cylinder. One known type is the screw type in which the rod contains external screw threads and the piston is mounted on the rod by means of mating internal screw threads. It is known to apply a torque load on such a connection, therewith tightening the mating threads sufficiently to apply an initial axial preload between the shoulder of the rod and piston, greater than the separating or the shoulder surface crushing force caused by hydraulic fluid pressure. Such an arrangement is not satisfactory in many severe applications, mainly because such an arrangement may accomplish tight contact only between a few thread flanks, instead of between all available thread flanks, due to manufacturing tolerances. Then, either a hydraulic transient shock load and/or a mechanical shock load, such as caused by bottoming out of the piston in extending mode may cause these few mating theads to yield whereby the initial preload would be immediately reduced to zero.

In either event, or both, the screw connection between the piston and the rod then will not be tight and this makes possible another phenomenon in a severe application. Non-uniform axial loading, plus cumulative tolerance may lead to bending of the cylinder and, albeit very small, relative rotation between the cylinder and the rod. With the piston tight against the cylinder wall this effects a small increment ratchet action on the piston and threads, which conventional normal restraints such as cotter pins, set screws and the like fail to control adequately. Consequently, after a sufficient amount of cycles of operation the piston may come off the rod with all the inherent damage.

The object of the present invention is to provide a screw type rigid connection for mounting a piston on a rod which is superior to prior piston and rod connections. A piston and rod connection which is similar in some respects to the present connection is shown in the U.S. Pat. No. 2,758,897 Naab. However, the present construction provides a piston and rod connection which can allow a shorter piston, requires less parts and is easier and less costly to manufacture than the construction of the said patent.

SUMMARY OF THE INVENTION

In carrying out my invention in one preferred form I provide for mounting a piston on a rod by means of an external screw threaded portion on the rod and an internal screw threaded portion on the piston which mates with the first mentioned screw threaded portion. At least one longitudinally disposed slot is provided in the threaded surface of each of the members and a locking member is located conjointly in both of the slots. A retainer member secures the locking member in position.

DESCRIPTION OF A PREFERRED EMBODIMENT

Figure 1:
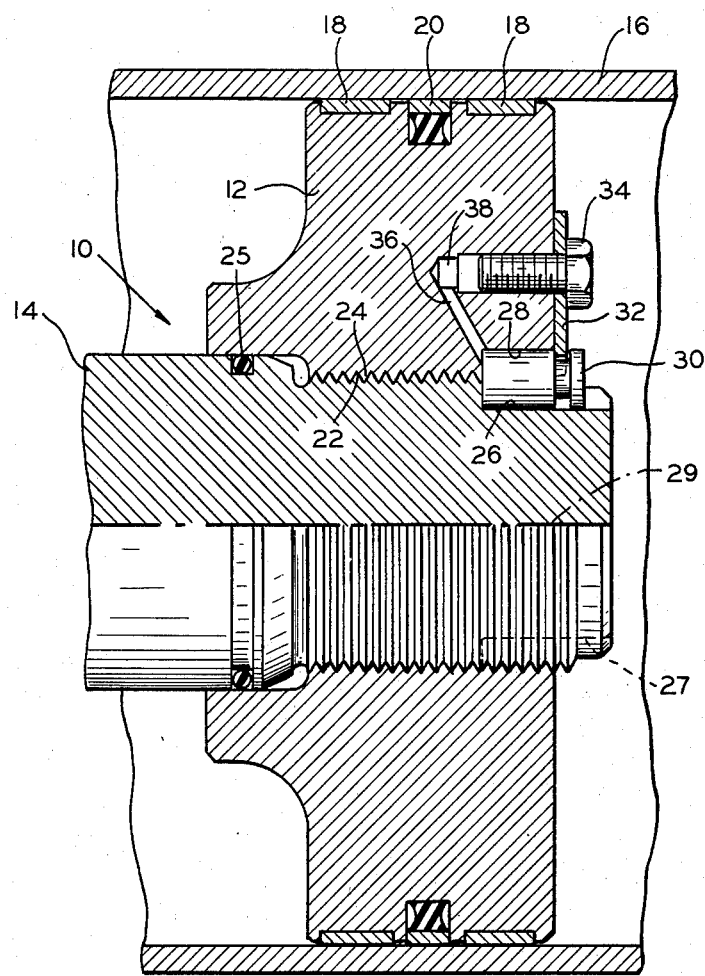
FIG. 1 of the drawing is a side elevational view, mostly in section, illustrating the connection of the present invention.

In the drawing the numeral 10 indicates generally the connection between a piston 12 and a rod 14. The piston is fixed on to the rod by means of the connection 10 and is arranged to reciprocate in an outer cylinder indicated at 16 to form a linear actuator. The piston may be provided around its outer circumference with guides and bearings 18 and a seal indicated at 20.

The screw connection between the rod and piston comprises an external screw threaded portion 22 on the rod and an internal screw threaded portion 24 on the piston which mates with the external threaded portion 22 when the piston is screwed on to the rod. A seal such as an O-ring 25 is provided to seal the joint between the piston and rod to prevent the passage of fluid between opposite sides of the piston during the operation of the piston and rod as a portion of a linear fluid actuator.

Figure 2:
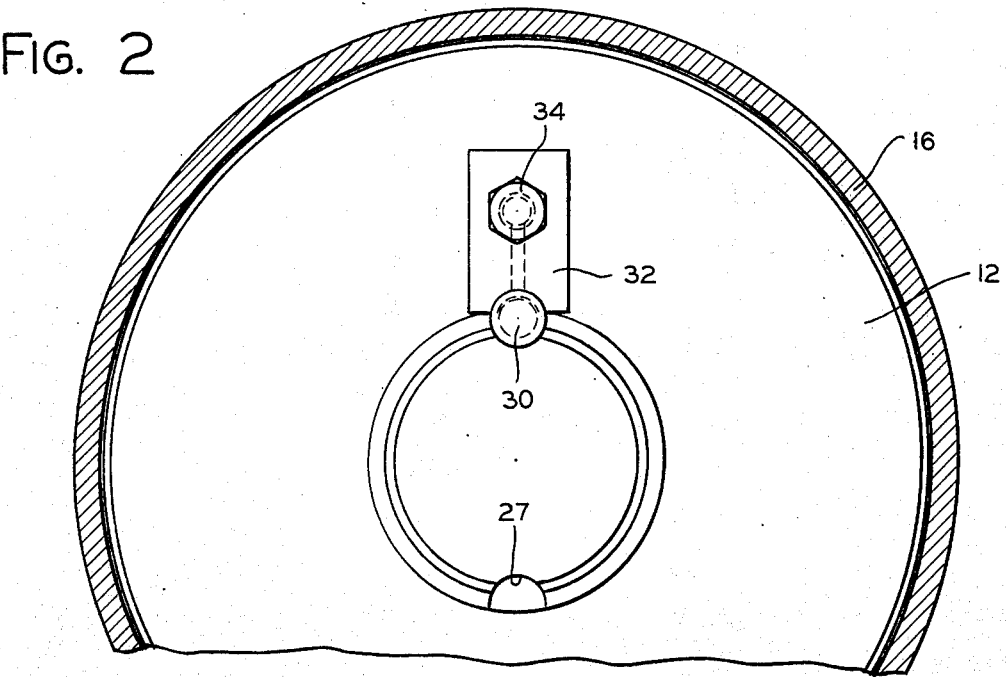
FIG. 2 is a partial end view of the same connection.

As indicated in both FIG. 1 and FIG. 2 the external threaded surface on the rod is provided with a pair of longitudinal slots in the outer surface of the external threaded portion, on diametrically opposite sides, and these are designated by the numeral 26 for the one at the top and the numeral 27 for the one at the bottom. The piston 12 is provided with a longitudinal slot 28 in the inner surface of the internal threaded portion, which is in alignment with one of the slots 26 in the condition shown in FIGS. 1 and 2, that is, the circumferential position of the piston relative to the rod. As shown, all three of the slots are approximately semi-circular in cross section and their longitudinal axes are parallel to the longitudinal axis 29 of the rod and piston. A locking member 30 is installed conjointly in the slots 26 and 28. The locking member 30 may be a hardened steel dowel pin and its presence prevents rotational or unscrewing motion of the piston 12 relative to the rod 14. The locking member 30 in turn is retained in position by means of a flat retainer 32 which is secured to the piston in a suitable manner, for example, by a threaded fastener which is shown as a cap screw 34.

A conduit 36 is shown connecting the inner end of the opening 38 in which cap screw 34 is located to a portion of the inner surface of locking member 30. The purpose of this arrangement is to facilitate the removal of locking member 30. It will be appreciated that after the connection shown has been in operation for a considerable period of time that it may be difficult to remove pin 30. With the arrangement shown, the cap screw 34 and retainer 32 are removed, then a grease gun or equivalent means is applied to the opening 38 for the cap screw. Such pressurized grease, acting through the conduit 36 on the inner end of the locking member 30 forces the locking member out of its location in slots 26 and 28.

As shown, the piston rod 14 is provided with two openings, 26 and 27, on diametrically opposite sides of the external threaded portion and adjacent the right end as shown in FIG. 1. It will be appreciated that the use of two slots in the rod in this manner on diametrically opposite sides of the externally threaded portion provides for lengthwise adjustment of the piston on the rod during installation in increments equal to one-half of the pitch of the threads used. It will be understood if more accurate adjustment is required that additional slots such as 26 and 27 can be added to piston rod 14 to cooperate with slot 28 in the piston member. It is possible also to add additional slots to the piston member to provide for a finer adjustment.

While I have described and illustrated herein the best mode contemplated for carrying out my invention, it will be appreciated that modifications may be made by those skilled in the art. Accordingly, it should be understood that I intend to cover by the appended claim all such modifications which fall within the true spirit and scope of my invention.

I claim:

1. A connection mounting a piston on a rod comprising, an external screw threaded portion on the rod, an internal screw threaded portion on the piston mating with the said external screw threaded portion, the said screw threaded portions defining a longitudinal axis, at least one longitudinally disposed slot in the outer surface of the said external screw threaded portion, at least one longitudinally disposed slot in the inner surface of the said internal screw threaded portion and arranged to align with the first mentioned slot at one circumferential position of said piston on said rod, a locking member located conjointly in both the said slots, a retainer member securing the locking member in said position, the said retainer member being secured to the said piston by means of a threaded fastener in an opening in the said piston, and a conduit connecting the inner end of said opening in the piston to the inner end of the said longitudinally disposed slot in the said internal screw threaded portion whereby the application of pressure through the said opening for the threaded fastener may be utilized to force the said locking member from its locking position.

* * * * *